US006370998B1

United States Patent
Yokoro et al.

(10) Patent No.: US 6,370,998 B1
(45) Date of Patent: Apr. 16, 2002

(54) ROTATING-DRUM FLYING SHEAR

(75) Inventors: Seiji Yokoro; Kazuhiko Horie; Toru Teraichi, all of Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/485,727

(22) PCT Filed: Jun. 4, 1999

(86) PCT No.: PCT/JP99/02989

§ 371 Date: Feb. 15, 2000

§ 102(e) Date: Feb. 15, 2000

(87) PCT Pub. No.: WO00/74885

PCT Pub. Date: Dec. 14, 2000

(51) Int. Cl.[7] .................................................. B26D 1/00
(52) U.S. Cl. .............................. 83/698.11; 83/698.61; 83/502; 83/698.51; 83/344
(58) Field of Search .................... 83/698.51, 674, 83/304, 305, 698.61, 344, 698.11, 698.41, 501, 502

(56) References Cited

U.S. PATENT DOCUMENTS 3,309,953 A * 3/1967 Hallden ........................ 83/305
3,469,477 A * 9/1969 Welch et al. .................. 83/305
3,863,537 A * 2/1975 Huelsman ..................... 83/503
3,897,705 A * 8/1975 Filleau et al. ................. 83/341
4,470,331 A * 9/1984 Eiting et al. .................. 83/333
4,667,550 A * 5/1987 Eiting ............................ 83/56
4,922,778 A * 5/1990 Nagai ........................... 83/501
5,048,387 A * 9/1991 Niitsuma et al. ............. 83/344
5,207,138 A * 5/1993 Sato et al. .................... 83/337
5,365,814 A * 11/1994 Irikura ........................... 83/74
5,857,396 A * 1/1999 Strouse, Jr. .................. 83/502

FOREIGN PATENT DOCUMENTS

JP          A5-123919     5/1993
JP          5131320 A     5/1993

* cited by examiner

Primary Examiner—Boyer Ashley
Assistant Examiner—Omar Flores Sa'nchez

(57) ABSTRACT

Upper and lower rotating drums (13, 14) having shearing blades (13a, 14a) are supported by a bearing frame (12) via eccentric sleeves (15, 16). Only the upper rotating drum (13) is rotated by a drive motor 17, while the eccentric sleeves (15, 16) are rotated by a drive motor 25, so that the rotating drums (13, 14) can be made to approach and separate from each other. Interlocking gears (29, 30) are fixed to shaft end portions of the rotating drums (13, 14) to permit interlocking of the rotating drums (13, 14) when these drums approach. Oldham's couplings (41, 42) are interposed between the interlocking gears (29, 30) and timing gears (33, 34) to rotate the rotating drums (13, 14) constantly and synchronously.

14 Claims, 8 Drawing Sheets

ROTATING-DRUM FLYING SHEAR

This application is the national phase under 35 U.S.C. §371 of PCT International Application No. PCT/JP99/02989 which has an International filing date of Jun. 4, 1999, which designated the United States of America.

FIELD OF THE INVENTION

This invention relates to a rotating-drum flying shear applied to a hot rolling equipment line or the like.

BACKGROUND OF THE INVENTION

A rotating-drum flying shear applied to a hot rolling equipment line or the like is disclosed, for example, in Japanese Unexamined Patent Publication No. 123919/1993. FIG. 8 shows the outline of a conventional rotating-drum flying shear disclosed in this publication.

In the conventional rotating-drum flying shear, as shown in FIG. 8, an extractable bearing frame 102 is mounted inside a housing 101. Inside the bearing frame 102, an upper rotating drum 103 and a lower rotating drum 104 as a pair are supported rotatably and movably toward and away from each other. The rotating drums 103 and 104 have shearing blades 103a and 104a, respectively, on their outer peripheral portions along their axial direction. That is, the upper rotating drum 103 has shaft end portions supported by the bearing frame 102 via eccentric sleeves 105, while the lower rotating drum 104 has shaft end portions supported by the bearing frame 102 via eccentric sleeves 106. By turning the eccentric sleeves 105 and 106, the upper and lower rotating drums 103 and 104 can be moved up and down so as to be movable toward and away from each other.

Laterally of the housing 101, a drive motor 107 is installed. An output shaft of the drive motor 107 is coupled to a gear box 108 having a pair of timing gears 108a, 108b. A rotating shaft of the timing gear 108a is connected to the shaft end portion of the upper rotating drum 103 by a transmission shaft 110 having universal joints 109a, 109b. Whereas a rotating shaft of the timing gear 108b is connected to the shaft end portion of the lower rotating drum 104 by a transmission shaft 112 having universal joints 111a, 111b. Thus, when the drive motor 107 is driven, its driving force is transmitted to the upper rotating drum 103 via the timing gear 108a and the transmission shaft 110, and is also transmitted to the lower rotating drum 104 via the timing gear 108b and the transmission shaft 112. As a result, the upper rotating drum 103 and the lower rotating drum 104 can be rotated synchronously in opposite directions.

A coupling gear 113 is fixed to the outside of the eccentric sleeve 105 that supports each shaft end portion of the upper rotating drum 103. A coupling gear 114 meshing with the coupling gear 113 is fixed to the outside of the eccentric sleeve 106 that supports each shaft end portion of the lower rotating drum 104. Below the coupling gear 114, a coupling gear 115 meshing with the coupling gear 114 is rotatably supported on the bearing frame 102 by a connecting shaft 116. Beside the housing 101, a drive motor 117 is installed. An output shaft 118 of the drive motor 117 is connected to the connecting shaft 116 via a transmission shaft 120 having universal joints 119a, 119b. Thus, when the drive motor 117 is driven, its driving force is transmitted to the coupling gear 115 via the transmission shaft 120 and the connecting shaft 116. As a result, the eccentric sleeve 105 integral with the coupling gear 113 is turned. Also, the eccentric sleeve 106 integral with the coupling gear 114 is turned. Hence, the rotating drums 103 and 104 can be moved toward and away from each other.

Furthermore, an interlocking gear 121 is fixed to each shaft end portion of the upper rotating drum 103 externally of the coupling gear 113. To each shaft end portion of the lower rotating drum 104, an interlocking gear 122 is fixed externally of the coupling gear 114. Thus, the interlocking gear 121 and the interlocking gear 122 do not mesh when the upper rotating drum 103 and the lower rotating drum 104 are apart from each other. When the upper rotating drum 103 and the lower rotating drum 104 are close to each other, the interlocking gear 121 and the interlocking gear 122 mesh. When the rotating drums 103 and 104 are rotated at this time, these rotating drums 103 and 104 can be instantaneously put into coaction with strong mesh.

With the foregoing conventional rotating-drum flying shear, a strip plate (not shown) moves fast, while being rolled, on a rolling equipment line. The strip plate passes between the upper rotating drum 103 and the lower rotating drum 104 that are separated from each other. Then, the strip plate is wound on a down-coiler at the end of the line. When the windup of the strip plate approaches completion, the drive motor 107 is driven to start rotating the rotating drums 103 and 104 synchronously in opposite directions via the transmission shafts 110 and 112, and adjust their rotational speed to be commensurate with the traveling speed of the strip plate. At a shearing position of the strip plate, the drive motor 117 is driven to turn the eccentric sleeves 105, 106 via the transmission shaft 120 and the coupling gears 115, 113, 114, thereby making the rotating drums 103 and 104 approach each other. At the approaching positions of the rotating drums 103 and 104, the interlocking gears 121 and 122 mesh, whereupon the rotating drums 103 and 104 coact with instantaneous strong mesh. Consequently, the strip plate during movement can be sheared by the shearing blades 103a and 104a.

The conventional rotating-drum flying shear allows the single drive motor 107 to rotate the two rotating drums 103 and 104. For this purpose, the output shaft of the drive motor 107 is coupled to the gear box 108 having the timing gears 108a, 108b, and the gear box 108 is connected to the shaft end portions of the rotating drums 103 and 104 by the two transmission shafts 110 and 112. This poses the problem that the two transmission shafts 110 and 112 are elongated, and this drive system is upsized. Moreover, the two transmission shafts 110 and 112 are disposed at upper and lower positions in the same vertical plane. This makes it difficult to support these transmission shafts 110 and 112, and complicates the arrangement of a transmission system, so that its maintenance is not easy.

The present invention has been accomplished to solve these problems, and its object is to provide a rotating-drum flying shear of a downsized and simplified structure.

SUMMARY OF THE INVENTION

A rotating-drum flying shear according to the present invention comprises: a bearing frame; a pair of rotating drums each having shaft end portions rotatably supported by the bearing frame, and each having a shearing blade on an outer peripheral portion of the drum along an axial direction of the drum; rotating drum drive means for rotationally driving one of the pair of rotating drums; a pair of eccentric sleeves interposed, rotatably relative to each other, between the bearing frame and the shaft end portions of the pair of rotating drums; eccentric sleeve drive means for rotating the pair of eccentric sleeves relative to each other, thereby making the pair of rotating drums approach or separate from each other; rotating drum interlocking means for interlocking the pair of rotating drums when the pair of rotating drums approach each other; and rotating drum synchronizing means for synchronously rotating the one rotating drum and the other rotating drum regardless of approaching positions or separating positions of the pair of rotating drums.

Thus, a single transmission system connects the rotating drum drive means and the rotating drums together, so that this transmission system can be downsized. Besides, it is easy to support this transmission system, and its arrangement can be simplified. Consequently, its maintenance can be performed with safety and ease.

In the rotating-drum flying shear of the invention, the rotating drum interlocking means has a pair of interlocking gears fixed to the shaft end portions of the pair of rotating drums, and the rotating drum synchronizing means has a pair of timing gears opposed to the pair of interlocking gears in an axial direction in a mutually meshing state and rotatably supported by the bearing frame, and Oldham's couplings interposed between the pair of interlocking gears and the pair of timing gears.

Thus, the interlocking gears, the timing gears, and the Oldham's couplings are disposed, as a unit, on the bearing frame. By so doing, the bearing frame can be extracted as a block together with these members, and checked and repaired as a unit. Thus, maintenance can be performed safely and easily.

In the rotating-drum flying shear of the invention, the pair of timing gears are disposed at positions opposed to the pair of interlocking gears when the pair of rotating drums are at separating positions, and the Oldham's couplings are disposed between end faces of the pair of interlocking gears and end faces of the pair of timing gears.

Thus, the structure can be simplified, and the manufacturing cost can be reduced.

In the rotating-drum flying shear of the invention, the rotating drum interlocking means has a pair of interlocking gears fixed to the shaft end portions of the pair of rotating drums, and the rotating drum synchronizing means has a pair of timing gears rotatably and horizontally movably supported by the bearing frame, while meshing with each other and meshing with the pair of interlocking gears.

Thus, the interlocking gears and the timing gears are disposed, as a unit, on the bearing frame. By so doing, the bearing frame can be extracted as a block together with these members, and checked and repaired as a unit. Thus, maintenance can be performed safely and easily.

In the rotating-drum flying shear of the invention, the pair of timing gears are rotatably supported by a horizontally movable frame horizontally movably supported by the bearing frame, and the pair of timing gears are link coupled while meshing with the pair of interlocking gears.

Thus, the structure can be simplified, and the manufacturing cost can be reduced.

DESCRIPTION OF THE PREFERRED EMBODIMENT

Embodiments of the present invention will now be described in detail based on the accompanying drawings.

First Embodiment

Figure 1:
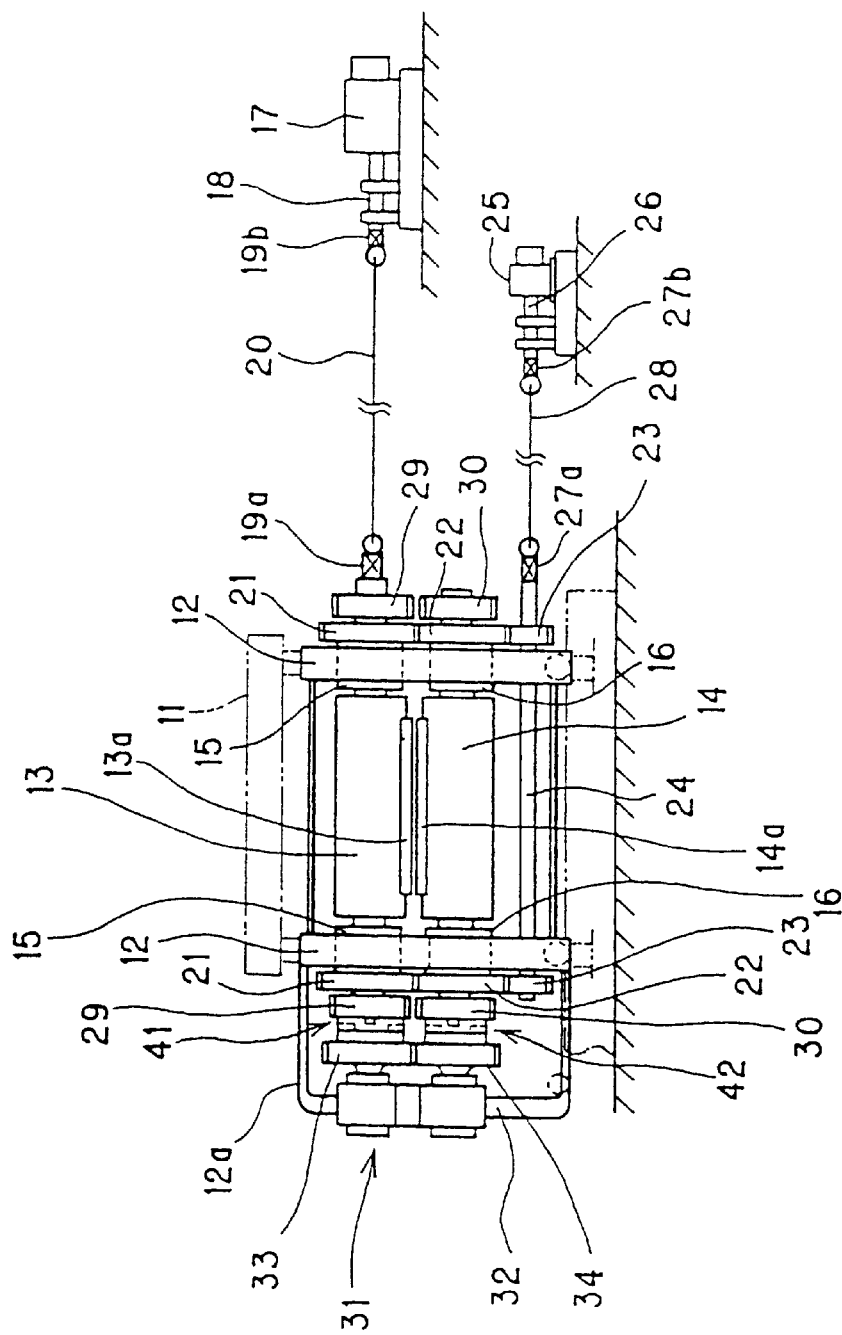
FIG. 1 is a schematic constitution drawing of a rotating-drum flying shear according to a first embodiment of the present invention.
Figure 2:
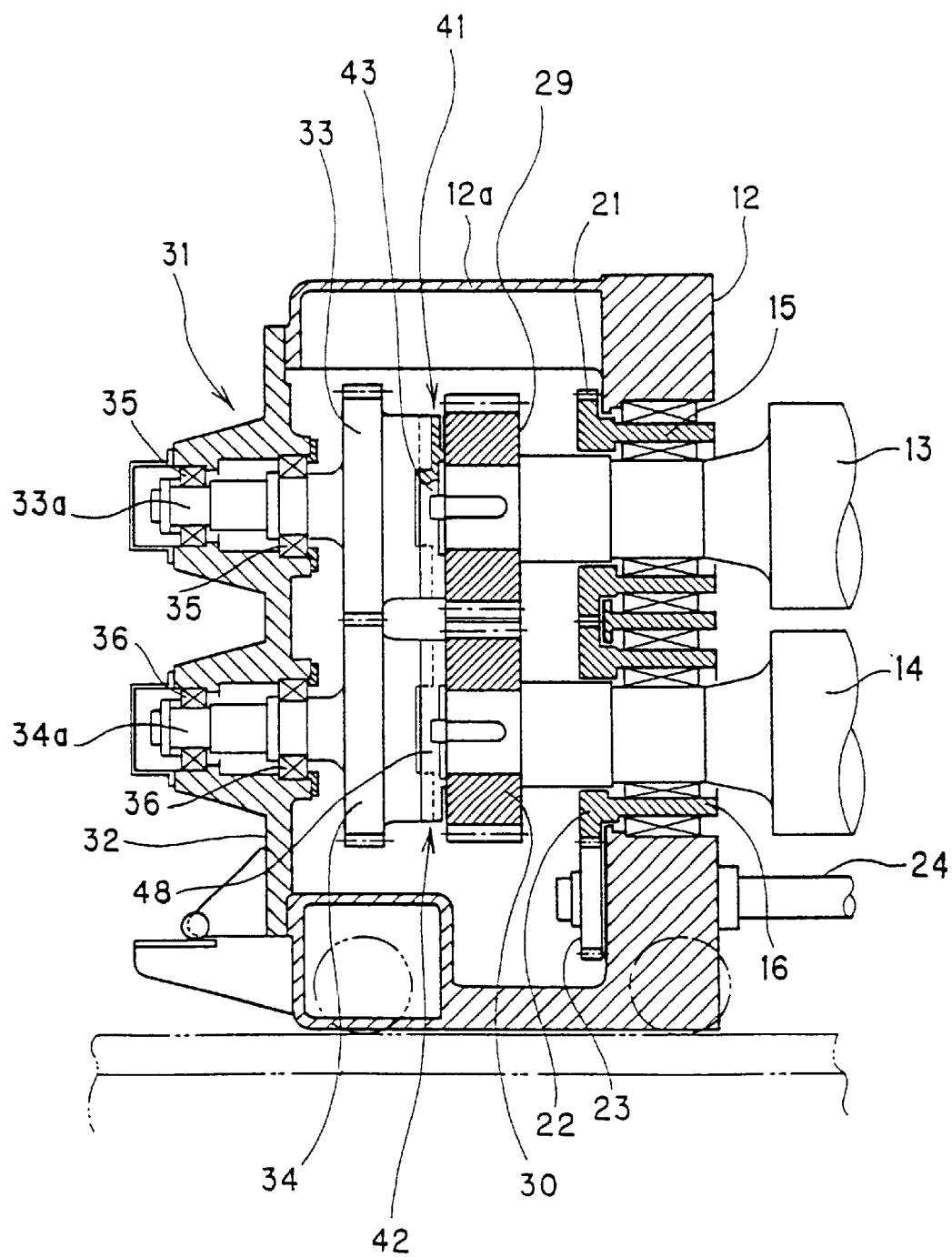
FIG. 2 is a sectional view showing an essential part of a rotating drum synchronizing mechanism of the rotating-drum flying shear according to the present embodiment.

In a rotating-drum flying shear according to a first embodiment, as shown in FIGS. 1 and 2, right and left extractable bearing frames 12 as a pair are mounted inside a housing 11. The right and left bearing frames 12 are composed as an integral block with the use of tie bolts (not shown). Inside the bearing frames 12, an upper rotating drum 13 and a lower rotating drum 14 as a pair are supported so as to be rotatable and upwardly and downwardly movable toward and away from each other. The rotating drums 13 and 14 have shearing blades 13a and 14a, respectively, on their outer peripheral portions along their axial direction. That is, the upper rotating drum 13 has shaft end portions supported by the bearing frames 12 via eccentric sleeves 15, while the lower rotating drum 14 has shaft end portions supported by the bearing frames 12 via eccentric sleeves 16. By turning the eccentric sleeves 15 and 16, the upper and lower rotating drums 13 and 14 can be moved up and down so as to be movable toward and away from each other.

Laterally of the housing 11, a drive motor 17 as a rotating drum drive means is installed. An output shaft 18 of the drive motor 17 is connected to the shaft end portion of the upper rotating drum 13 by a transmission shaft 20 having universal joints 19a, 19b. Thus, when the drive motor 17 is driven, its driving force is transmitted from the output shaft 18 to the upper rotating drum 13 via the transmission shaft 20. As a result, the upper rotating drum 13 can be rotated in one direction.

A coupling gear 21 is fixed to the outside of the eccentric sleeve 15 that supports each shaft end portion of the upper rotating drum 13. A coupling gear 22 meshing with the coupling gear 21 is fixed to the outside of the eccentric sleeve 16 that supports each shaft end portion of the lower rotating drum 14. Below the coupling gear 22, a coupling gear 23 meshing with the coupling gear 22 is rotatably supported on the bearing frame 12 by a connecting shaft 24. Beside the housing 11, a drive motor 25 as an eccentric sleeve drive means is installed. An output shaft 26 of the drive motor 25 is connected to the connecting shaft 24 by a transmission shaft 28 having universal joints 27a, 27b. Thus, when the drive motor 25 is driven, its driving force is transmitted to the coupling gear 23 via the transmission shaft 28 and the connecting shaft 24, and then transmitted to the coupling gear 22 meshing with the coupling gear 23, and to the coupling gear 21. As a result, the eccentric sleeve 15 integral with the coupling gear 21 is turned. Also, the eccentric sleeve 16 integral with the coupling gear 22 is turned. Hence, the upper and lower rotating drums 13 and 14 can be made to approach and separate from each other.

Furthermore, an interlocking gear 29 is fixed to each shaft end portion of the upper rotating drum 13 externally of the coupling gear 21. To each shaft end portion of the lower rotating drum 14, an interlocking gear 30 is fixed externally of the coupling gear 22. That is, the interlocking gears 29 and 30 constitute a rotating drum interlocking means. Thus, when the upper rotating drum 13 and the lower rotating drum 14 are located at spaced apart positions, the interlocking gear 29 and the interlocking gear 30 are out of mesh. When the rotating drums 13 and 14 lie at positions close to each other, the interlocking gear 29 and the interlocking gear 30 are in mesh. When the rotating drums 13 and 14 are rotated at this time, these rotating drums 13 and 14 can be instantaneously put into coaction with strong mesh.

On a work side of the rotating drums 13, 14 (the left side in FIG. 1), a rotating drum synchronizing mechanism 31 is provided for transmitting the rotational force of the upper rotating drum 13 to the lower rotating drum 14 regardless of an approaching position or separating position of the upper rotating drum 13 to rotate both rotating drums 13 and 14 synchronously. That is, in the rotating drum synchronizing mechanism 31, upper and lower timing gears 33 and 34 as a pair are opposed, in a mutually meshing state, to the upper and lower interlocking gears 29 and 30 fixed to the shaft end portions of the rotating drums 13 and 14. Rotating shafts 33a and 34a of the timing gears 33 and 34 are rotatably supported by bearings 35 and 36 on a support frame 32 fixed to a frame housing 12a of the bearing frame 12. Between the upper and lower interlocking gears 29, 30 and the upper and lower timing gears 33, 34, Oldham's couplings 41, 42 are interposed, and these gears and couplings are connected together integrally rotatably.

Figure 3:
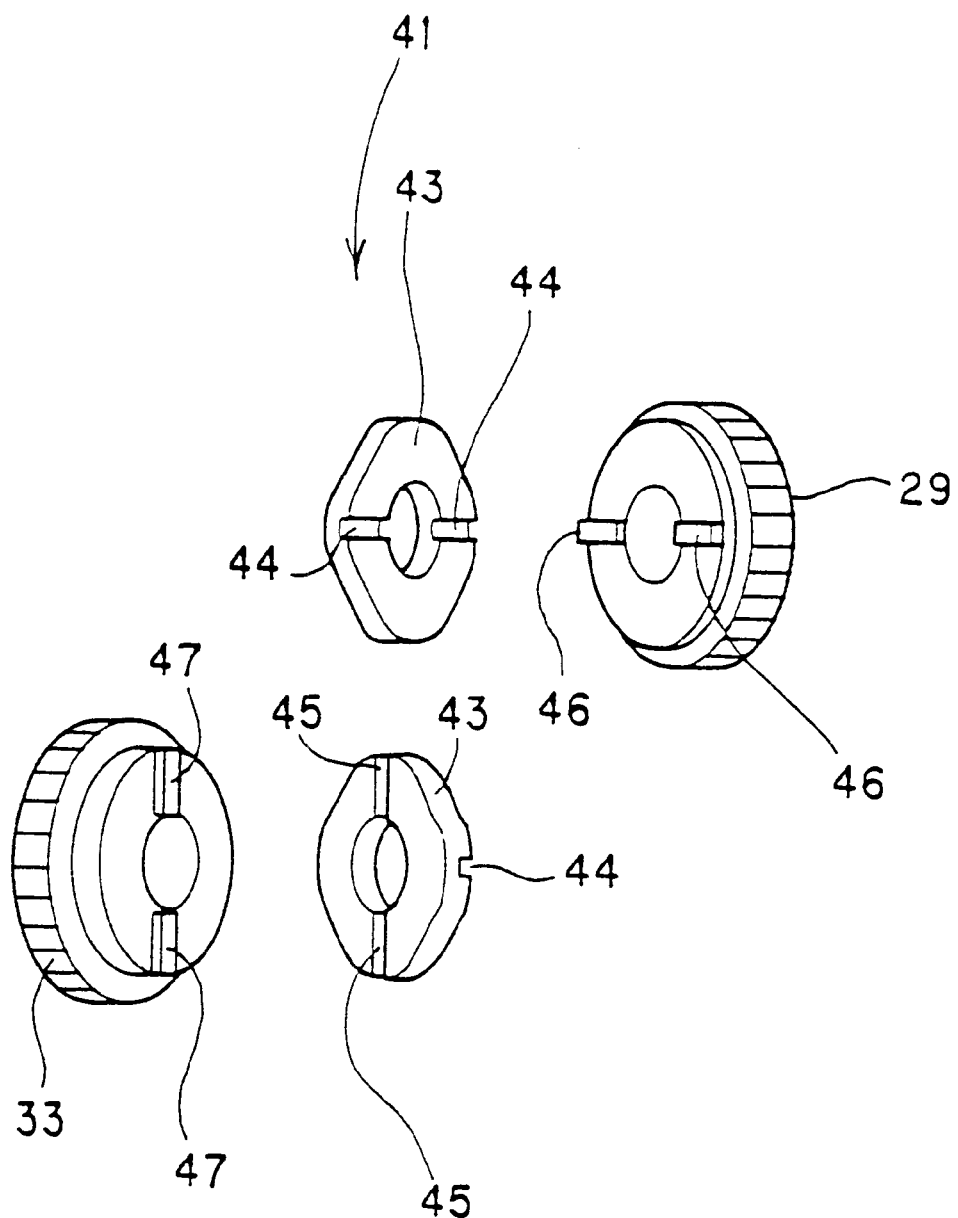
FIG. 3 is an exploded perspective view of an Oldham's coupling.

The Oldham's coupling 41 has an annular plate-like fitting piece 43 disposed between the interlocking gear 29 and the timing gear 33, as shown in detail in FIG. 3. In an end face of the fitting piece 43, right and left fitting grooves 44 as a pair are formed along a diametrical direction. On the other end face of the fitting piece 43, upper and lower fitting grooves 45 as a pair are formed along a diametrical direction. On an end face of the interlocking gear 29, right and left protrusions 46 as a pair to be fitted into the fitting grooves 44 are formed. On an end face of the timing gear 33, upper and lower protrusions 47 as a pair to be fitted into the fitting grooves 45 are formed. The Oldham's coupling 42 has the same constitution as that of the Oldham's coupling 41, and has a fitting piece 48 of the same shape as the fitting piece 43 disposed between the interlocking gear 30 and the timing gear 34. When the pair of rotating drums 13 and 14 are located at spaced apart positions, the interlocking gears 29, 30 and the timing gears 33, 34 are opposed linearly.

Thus, when the upper rotating drum 13 and the lower rotating drum 14 are at spaced apart locations, as shown in FIG. 2, the rotational force of the upper rotating drum 13 is transmitted from the interlocking gear 29 to the timing gear 33 via the fitting piece 43 of the Oldham's coupling 41, and then transmitted from the timing gear 34 meshing with the timing gear 33 to the interlocking gear 30 via the fitting piece 48 of the Oldham's coupling 42. As a result, the lower rotating drum 14 integral with the interlocking gear 30 is rotated. Thus, the upper rotating drum 13 and the lower rotating drum 14 can be synchronously rotated in opposite directions. When the upper rotating drum 13 and the lower rotating drum 14 are close to each other, on the other hand, the interlocking gear 29 is displaced downward relative to the timing gear 33, while the interlocking gear 30 is displaced upward relative to the timing gear 34. These displacements are absorbed by sliding the protrusion 46, 47 in the fitting grooves 44, 45 of the fitting pieces 43, 48 of the Oldham's couplings 41, 42. Thus, the Oldham's couplings 41, 42 keep the interlocking gears 29, 30 and the timing gears 33, 34 in a drivingly connected state. Even when the rotating drums 13, 14 have moved to positions close to each other, both rotating drums 13 and 14 can be synchronously rotated in opposite directions in the same manner as stated earlier.

With the rotating-drum flying shear of the present embodiment constituted as described above, a strip plate (not shown) moves fast, while being rolled, on a rolling equipment line. As shown in FIG. 1, the strip plate passes between the upper rotating drum 13 and the lower rotating drum 14 that are apart from each other. Then, the strip plate is wound on a down-coiler at the end of the line. When the windup of the strip plate approaches completion, the drive motor 17 is driven to rotate the upper rotating drum 13 via the transmission shaft 20, and also rotate the lower rotating drum 14 via the interlocking gear 29, the Oldham's coupling 41, the timing gears 33, 34, the Oldham's coupling 42, and the interlocking gear 30. The upper rotating drum 13 and the lower rotating drum 14 are made to start rotation synchronously in opposite directions, and their rotational speed is adjusted to be commensurate with the traveling speed of the strip plate.

At a shearing position of the strip plate, the drive motor 25 is driven to turn the eccentric sleeves 15, 16 via the transmission shaft 28 and the coupling gears 23, 22, 21, thereby making the rotating drums 13 and 14 approach each other. At the approaching positions of the rotating drums 13 and 14, the interlocking gears 29 and 30 mesh, whereupon the rotating drums 13 and 14 coact with instantaneous strong mesh. Consequently, the strip plate during movement can be sheared by the shearing blades 13a and 14a.

According to the rotating-drum flying shear of the present embodiment, as described above, the drive motor 17 is drivingly connected to the upper rotating drum 13 alone. The upper rotating drum 13 and the lower rotating drum are drivingly connected together at the work side by the rotating drum synchronizing mechanism 31 in which the interlocking gears 29, 30 and the timing gears 33, 34 are connected by the Oldham's couplings 41, 42 so that power can be constantly transmitted between them.

Thus, the single transmission shaft 20 suffices to connect the drive motor 17 to the rotating drums 13, 14. The length of the transmission shaft 20 can be shortened by selecting the position of mounting of the drive motor 17 that minimizes the runout angle of the transmission shaft 20 during driving. Consequently, the drive system including the drive motor 17 and the transmission shaft 20 can be downsized.

The timing gears 33, 34 are disposed inside the frame housing 12a of the bearing frame 12. Thus, the bearing frame 12 is extracted as a block, and can be checked and repaired along with the instruments on the drive side. Furthermore, support for the single transmission shaft 20 becomes easy, and the arrangement of the transmission system is simplified, so that its maintenance can be done safely and easily.

Second Embodiment

In a rotating-drum flying shear according to a second embodiment, as shown in FIGS. 4 to 7, an upper rotating drum 13 and a lower rotating drum 14 as a pair, which have shearing blades 13a and 14a, are supported by eccentric sleeves 15, 16 on a bearing frame 12 of a housing 11 so as to be rotatable and upwardly and downwardly movable toward and away from each other. An output shaft 18 of a drive motor 17 is connected to a shaft end portion of the upper rotating drum 13 by a transmission shaft 20 having universal joints 19a, 19b. To the outside of the eccentric sleeves 15, 16 of the rotating drums 13, 14, coupling gears 21, 22 meshing with each other are fixed. The coupling gear 22 is in mesh with a coupling gear 23 supported on the bearing frame 12 by a connecting shaft 24. An output shaft 26 of a drive motor 25 is connected to the connecting shaft 24 by a transmission shaft 28 having universal joints 27a, 27b. To shaft end portions of the rotating drums 13, 14, interlocking gears 29, 30 are fixed which are situated outside the coupling gears 21, 22 and which can be in mesh or out of mesh with each other.

On a work side of the rotating drums 13, 14 (the left side in FIG. 4), a rotating drum synchronizing mechanism 51 is provided for transmitting the rotational force of the upper rotating drum 13 to the lower rotating drum 14 regardless of an approaching position or separating position of the upper rotating drum 13 to rotate both rotating drums 13 and 14 synchronously. That is, in the rotating drum synchronizing mechanism 51, a horizontally movable frame 52 is disposed inside a frame housing 12a of the bearing frame 12. A slide shoe 53 fixed to a lower portion of the horizontally movable frame 52 is supported by a rail piece 54, which is fixed to a bottom portion of the frame housing 12a, in such a manner as to be movable along a horizontal direction perpendicular to the axial direction of the rotating drums 13, 14. A projection 55 on an upper portion of the horizontally movable frame 52 is movably fitted into a guide groove 56 formed in a ceiling portion of the frame housing 12a.

Inside the horizontally movable frame 52, an upper timing gear 57 and a lower timing gear 58 as a pair are rotatably supported by rotating shafts 57a, 58a in a mutually meshing state. The upper and lower timing gears 57, 58 mesh with the upper and lower interlocking gears 29 and 30 fixed to the shaft end portions of the rotating drums 13 and 14. To maintain a constant meshing state between them, a pair of links 59, 60 are provided to span between the shaft end portions 13a, 14a of the rotating drums 13, 14 and the rotating shafts 57a, 58a.

Thus, when the upper rotating drum 13 and the lower rotating drum 14 are at spaced apart locations, the rotational force of the upper rotating drum 13 is transmitted from the interlocking gear 29 to the timing gear 57, and then transmitted from the timing gear 58 meshing with the timing gear 57 to the interlocking gear 30. As a result, the lower rotating drum 14 integral with the interlocking gear 30 is rotated. Thus, the upper rotating drum 13 and the lower rotating drum 14 can be synchronously rotated in opposite directions. When the upper rotating drum 13 and the lower rotating drum 14 are close to each other, on the other hand, the distance in the horizontal direction between the interlocking gears 29, 30 and the timing gears 57, 58 changes, but this change in the distance is absorbed, because the horizontally movable frame 52 is pushed via the links 59, 60. Hence, this movement of the horizontally movable frame 52 keeps the interlocking gears 29, 30 and the timing gears 57, 58 in a drivingly connected state. Even when the rotating drums 13, 14 have moved to positions at which they are close to each other, both rotating drums 13 and 14 can be synchronously rotated in opposite directions in the same manner as stated earlier.

Figure 4:
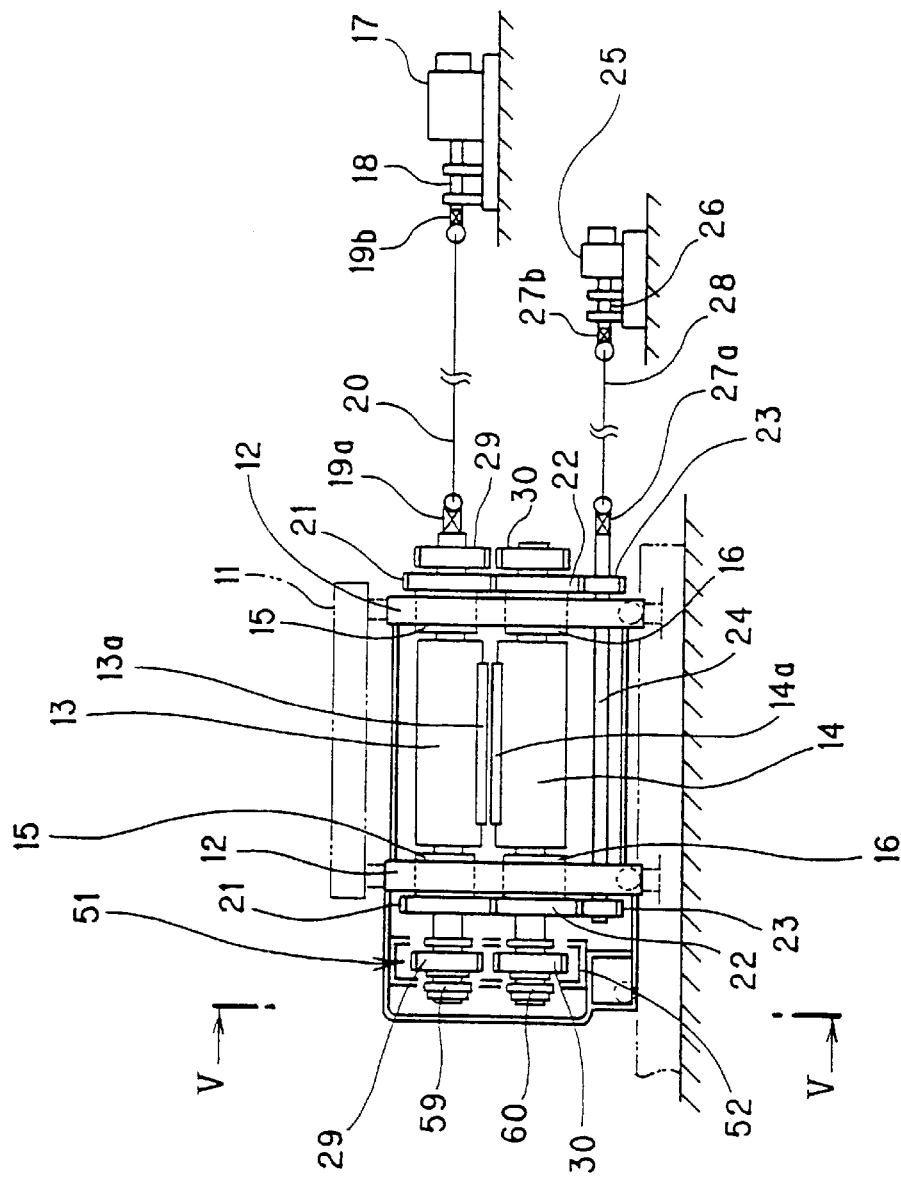
FIG. 4 is a schematic constitution drawing of a rotating-drum flying shear according to a second embodiment of the invention.
Figure 5:
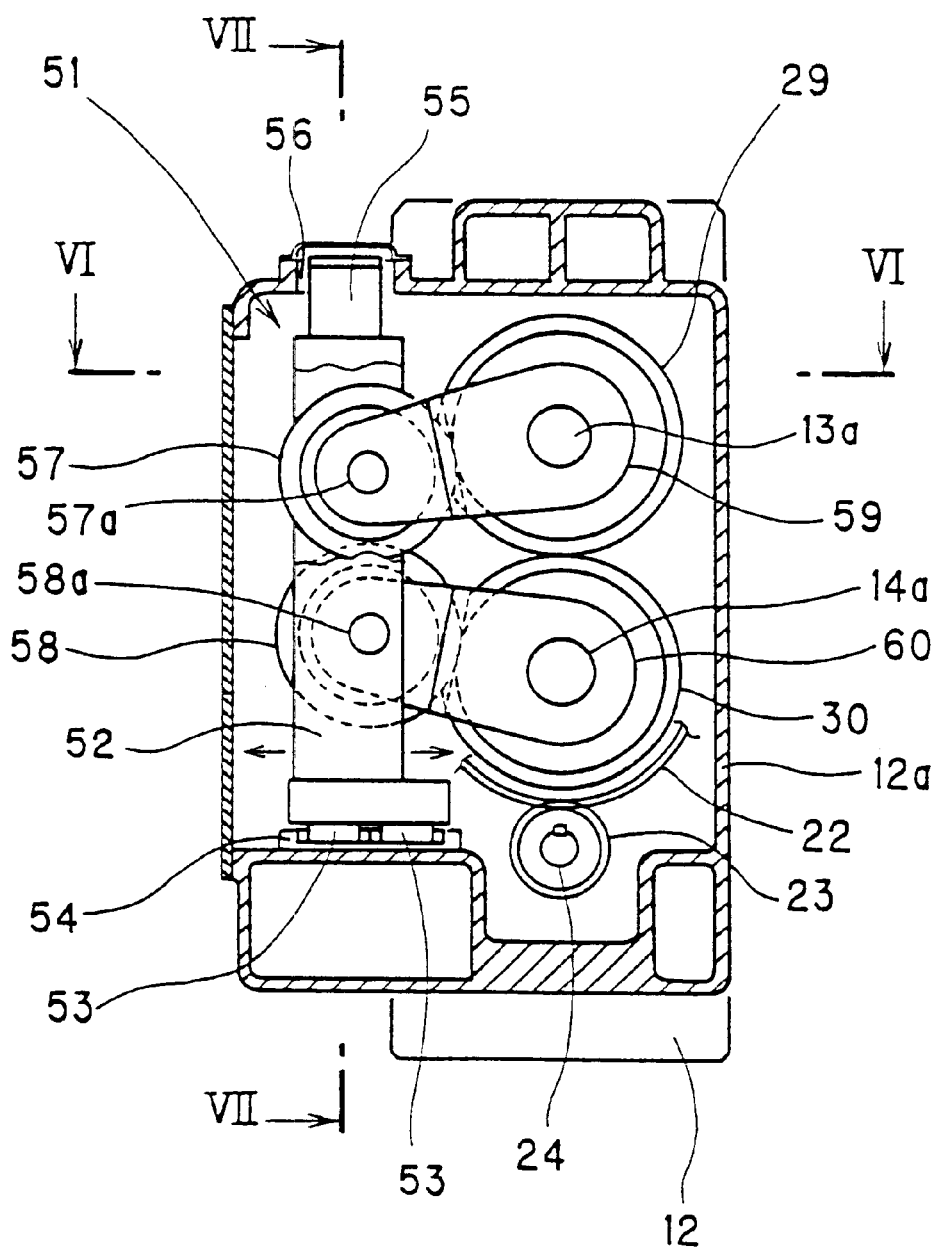
FIG. 5 is a sectional view taken on line V—V of FIG. 4, showing a rotating drum synchronizing mechanism of the rotating-drum flying shear according to the present embodiment.
Figure 6:
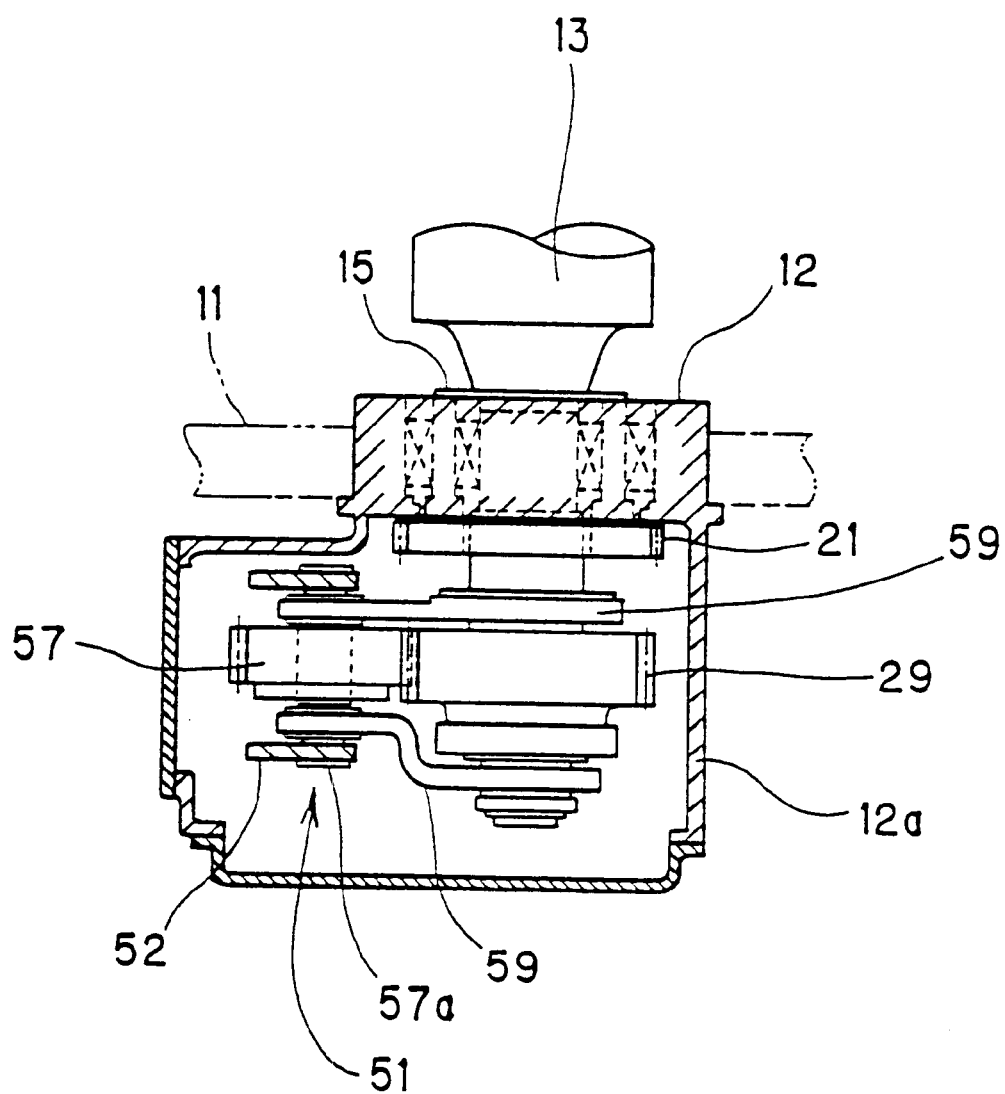
FIG. 6 is a sectional view taken on line VI—VI of FIG. 5.
Figure 7:
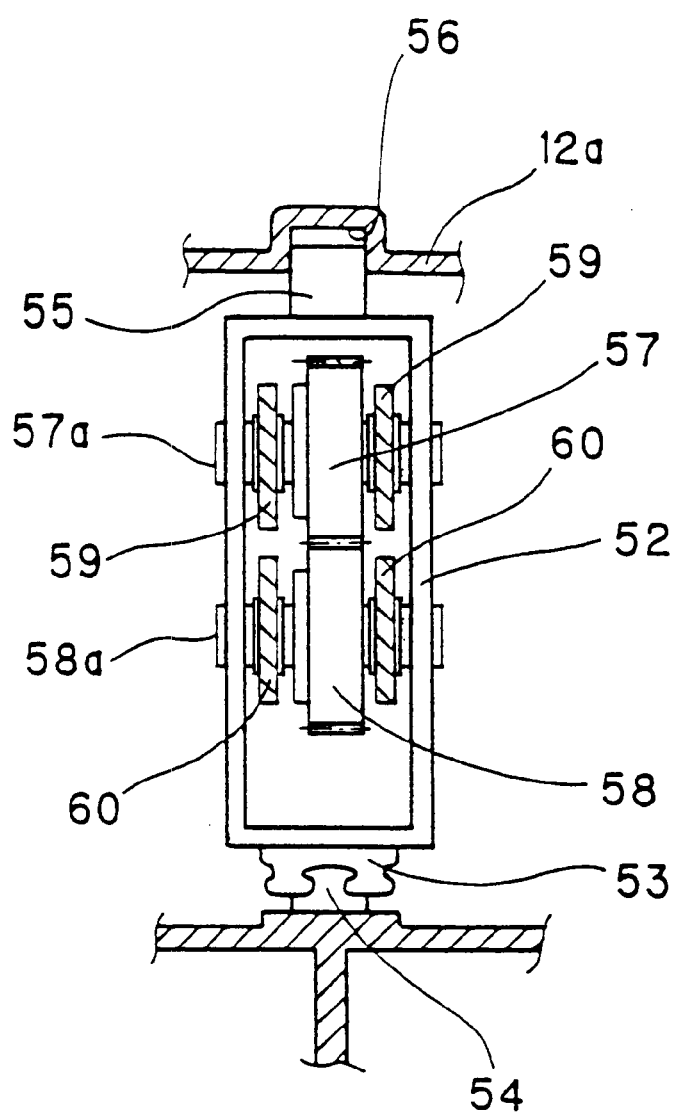
FIG. 7 is a sectional view taken on line VII—VII of FIG. 5.
Figure 8:
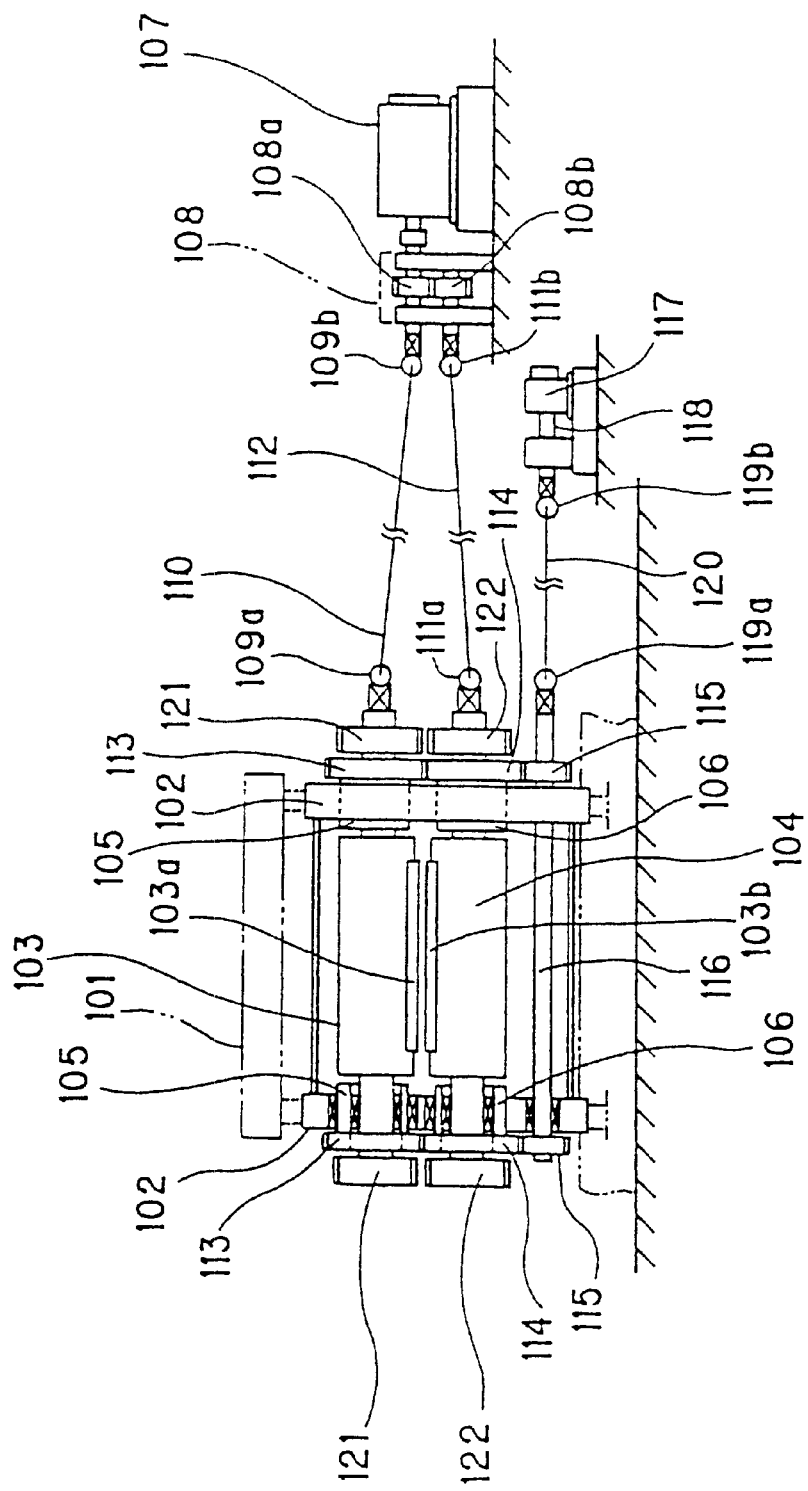
FIG. 8 is a schematic view of a conventional rotating-drum flying shear.

With the rotating-drum flying shear of the present embodiment constituted as described above, a strip plate (not shown) moves fast, while being rolled, on a rolling equipment line. As shown in FIG. 4, the strip plate passes between the upper rotating drum 13 and the lower rotating drum 14 that are apart from each other. Then, the strip plate is wound on a down-coiler at the end of the line. When the windup of the strip plate approaches completion, the drive motor 17 is driven to rotate the upper rotating drum 13 via the transmission shaft 20, and also rotate the lower rotating drum 14 via the interlocking gear 29, the timing gears 57, 58, and the interlocking gear 30. The upper rotating drum 13 and the lower rotating drum 14 are made to start rotation synchronously in opposite directions, and their rotational speed is adjusted to be commensurate with the traveling speed of the strip plate.

At a shearing position of the strip plate, the drive motor 25 is driven to turn the eccentric sleeves 15, 16 via the transmission shaft 28 and the coupling gears 23, 22, 21, thereby making the rotating drums 13 and 14 approach each other. At the approaching positions of the rotating drums 13 and 14, the interlocking gears 29 and 30 mesh, whereupon the rotating drums 13 and 14 coact with instantaneous strong mesh. Consequently, the strip plate during movement can be sheared by the shearing blades 13a and 14a.

According to the rotating-drum flying shear of the present embodiment, as described above, the drive motor 17 is drivingly connected to the upper rotating drum 13 alone. The upper rotating drum 13 and the lower rotating drum are drivingly connected together at the work side by the rotating drum synchronizing mechanism 51 in which the timing gears 57, 58 mounted on the horizontally movable frame 52 are connected to the interlocking gears 29, 30 for constant meshing therewith.

Thus, the single transmission shaft 20 suffices to connect the drive motor 17 to the rotating drums 13, 14. The length of the transmission shaft 20 can be shortened by selecting the position of mounting of the drive motor 17 that minimizes the runout angle of the transmission shaft 20 during driving. Consequently, the drive system including the drive motor 17 and the transmission shaft 20 can be downsized.

The timing gears 57, 58 are disposed inside the frame housing 12a of the bearing frame 12. Thus, the bearing frame 12 is extracted as a block, and,can be checked and repaired along with the instruments on the drive side. Furthermore, support for the single transmission shaft 20 becomes easy, and the arrangement of a transmission system is simplified, so that its maintenance can be done safely and easily.

Industrial Applicability

As described above, the rotating-drum flying shear of the present invention has a rotating drum synchronizing means for synchronously rotating a pair of rotating drums having shearing blades, thereby downsizing and simplifying a driving force transmission system. This apparatus of the invention is preferred for use on a hot rolling equipment line or the like.

What is claimed is:

1. A rotating-drum flying shear, comprising:
a bearing frame;
a pair of rotating drums each having shaft end portions rotatably supported by the bearing frame, and each having a shearing blade on an outer peripheral portion of the drum;
rotating drum drive means for rotationally driving one of the pair of rotating drums;
a pair of eccentric sleeves interposed, rotatably relative to each other, between the bearing frame and the shaft end portions of the pair of rotating drums;
eccentric sleeve drive means for rotating the pair of eccentric sleeves relative to each other, thereby making the pair of rotating drums approach or separate from each other;
rotating drum interlocking means for interlocking the pair of rotating drums only when the pair of rotating drums approach each other; and rotating drum synchronizing means for synchronously rotating the other of the pair of rotating drum by transmitting rotational force of the one of the pair of rotating drums to the other of the pair of rotating drums regardless of approaching positions or separating positions of the pair of rotating drums, wherein the rotating drum interlocking means has a pair of interlocking gears fixed to the shaft end portions of the pair of rotating drums, and the rotating drum synchronizing means has a pair of timing gears, for transmitting rotational force of said one of the pair of rotating drums to the other of the pair of rotating drums, opposed to the pair of interlocking gears in an axial direction in a mutually meshing state and rotatably supported by the bearing frame, and Oldham's couplings interposed between the pair of interlocking gears and the pair of timing gears.

2. The rotating-drum flying shear of claim 1, wherein the pair of timing gears are disposed at positions opposed to the pair of interlocking gears when the pair of rotating drums are at separating locations, and the Oldham's couplings are disposed between end faces of the pair of interlocking gears and end faces of the pair of timing gears.

3. A rotating-drum flying shear according to claim 1, wherein said rotating drum drive means provides rotational force to a first end of one of the pairs of rotating drums and said rotating drum synchronizing means is provided at a side of a second end of the pairs of rotating drums.

4. A rotating-drum flying shear according to claim 1, wherein said shearing blade is provided along an axial direction of the rotating drums.

5. A rotating-drum flying shear according to claim 1, further comprising:

a transmission shaft that connects said rotating drum drive means and said one of the pair of rotating drums.

6. A rotating-drum flying shear according to claim 5, further comprising:

a first universal joint provided between said rotating drum drive means and one end of the transmission shaft; and a second universal joint provided between the other end of the transmission shaft and said one of the pair of rotating drums.

7. A rotating-drum flying shear according to claim 1, wherein said rotating drum interlocking means and said rotating drum synchronizing means are independently provided.

8. The rotating-drum flying shear, comprising:

a bearing frame;

a pair of rotating drums each having shaft end portions rotatably supported by the bearing frame, and each having a shearing blade on an outer peripheral portion of the drum;

rotating drum drive means for rotationally driving only one of the pair of rotating drums;

a pair of eccentric sleeves interposed, rotatably relative to each other, between the bearing frame and the shaft end portions of the pair of rotating drums;

eccentric sleeve drive means for rotating the pair of eccentric sleeves relative to each other, thereby making the pair of rotating drums approach or separate from each other;

rotating drum interlocking means for interlocking the pair of rotating drums only when the pair of rotating drums approach each other; and rotating drum synchronizing means for synchronously rotating the other of the pair of rotating drum by transmitting rotational force of the one of the pair of rotating drums to the other of the pair of rotating drums regardless of approaching positions or separating positions of the pair of rotating drums, wherein the rotating drum interlocking means has a pair of interlocking gears fixed to the shaft end portions of the pair of rotating drums, and the rotating drum synchronizing means has a pair of timing gears, for transmitting rotational force of said one of the pair of rotating drums to the other of the pair of rotating drums, rotatably and horizontally movably supported by the bearing frame, while meshing with each other and meshing with the pair of interlocking gears.

9. The rotating-drum flying shear of claim 8, wherein the pair of timing gears are rotatably supported by a horizontally movable frame horizontally movably supported by the bearing frame, and the pair of timing gears are link coupled while meshing with the pair of interlocking gears.

10. A rotating-drum flying shear according to claim 8, wherein said rotating drum drive means provides rotational force to a first end of one of the pairs of rotating drums and said rotating drum synchronizing means is provided at a side of a second end of the pairs of rotating drums.

11. A rotating-drum flying shear according to claim 8, wherein said shearing blade is provided along an axial direction of the rotating drums.

12. A rotating-drum flying shear according to claim 8, further comprising:

a transmission shaft that connects said rotating drum drive means and said one of the pair of rotating drums.

13. A rotating-drum flying shear according to claim 12, further comprising:

a first universal joint provided between said rotating drum drive means and one end of the transmission shaft; and a second universal joint provided between the other end of the transmission shaft and said one of the pair of rotating drums.

14. A rotating-drum flying shear according to claim 8, wherein said rotating drum interlocking means and said rotating drum synchronizing means are independently provided.

* * * * *